United States Patent [19]

Furukawa et al.

[11] 4,338,683
[45] Jul. 6, 1982

[54] VIDEODISC PLAYER WITH CONSTANT TURNTABLE VELOCITY

[75] Inventors: Shunsuke Furukawa; Hiroshi Ogawa; Hitoshi Okada; Masanobu Yamamoto, all of Tokyo, Japan

[73] Assignee: Sony Corporation, Tokyo, Japan

[21] Appl. No.: 204,708

[22] Filed: Nov. 6, 1980

[30] Foreign Application Priority Data

Nov. 15, 1979 [JP] Japan ................... 54-148094

[51] Int. Cl.³ .............................................. G11B 17/00
[52] U.S. Cl. ...................................... 369/50; 369/240; 369/189; 360/73
[58] Field of Search ................. 369/50, 129, 240, 239, 369/189, 267, 111; 358/128.5; 360/73, 32; 318/314, 318

[56] References Cited

U.S. PATENT DOCUMENTS

| 3,564,434 | 2/1971 | Comenyind | 329/122 |
| 3,646,259 | 2/1972 | Schuller | 360/73 |
| 3,939,302 | 2/1976 | Kihara | 369/118 |
| 4,022,986 | 5/1977 | Leer | 360/32 |
| 4,223,349 | 9/1980 | Dakin | 369/50 |
| 4,236,050 | 11/1980 | Winslow | 360/73 |

Primary Examiner—Bernard Konick
Assistant Examiner—Alan Faber
Attorney, Agent, or Firm—Hill, Van Santen, Steadman, Chiara & Simpson

[57] ABSTRACT

In a disc record reproducing apparatus for reproducing a disc on which a PCM (pulse code modulation) signal in the form of an RLLC (run length limited code) is recorded, a reproduced PCM signal therefrom is frequency-divided at a constant frequency dividing ratio, a frequency-divided PCM signal is compared with a reference frequency signal, and then the rotation of the disc record is controlled by a compared output.

1 Claim, 4 Drawing Figures

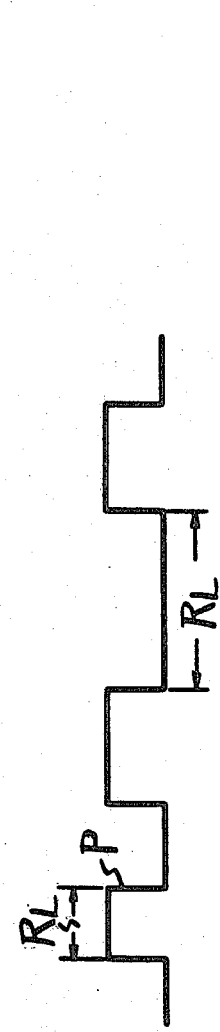
FIG. 1
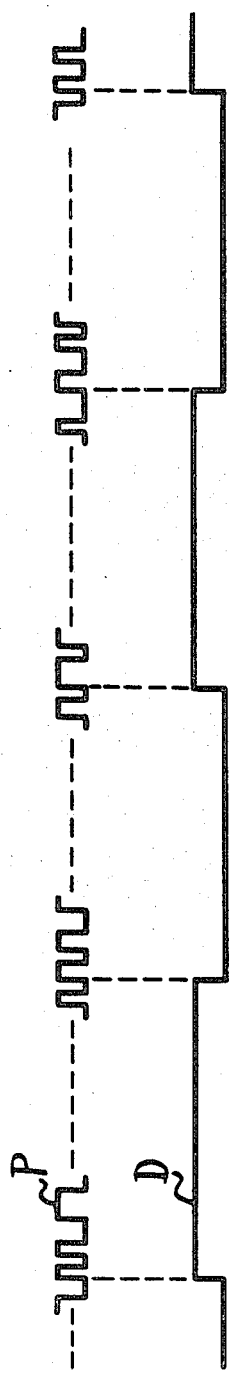
FIG. 2A
FIG. 2B

VIDEODISC PLAYER WITH CONSTANT TURNTABLE VELOCITY

BACKGROUND OF THE INVENTION

1. Field of the Invention

The present invention relates generally to a disc record reproducing apparatus, and is directed more particularly to a reproducing apparatus for a disc record on which, for example, a PCM (pulse code modulation) signal such as a PCM audio signal in the form of an RLLC (run length limited code) is recorded.

2. Description of the Prior Art

In the art, when a PCM signal is recorded on a disc, there are two methods one of which is a recording such that the angular velocity of the disc is selected to be constant and the other of which is a recording such that the line velocity of the disc is selected to be constant. In the case of the constant line velocity recording, its recording density is greatly improved as compared with the constant angular velocity recording, but in the case of the constant line velocity recording, it is necessary to reproduce the disc record with its line velocity being constant, which results in the rotation control of the disc record during reproduction is difficult.

In the case of a video disc, the rotation control thereof is carried out in a manner such that a reproduced signal is demodulated to provide a composite video signal, the synchronizing signal is then separated from the composite video signal, and the frequency of the synchronizing signal is made constant.

In the case of a PCM audio signal whose base band is recorded, it is generally a binary signal, so that the above method can not be employed. If the PCM audio signal is not recorded as the base band recording but is recorded after it is converted into a quase or pesudo video signal containing a synchronizing signal, the method which is the same as that in the case of the video disc can be employed. However, in this case the recording density is lowered, which will cancel the advantage of the constant line velocity recording.

On the other, a method may be considered during reproducing where the radial position of a pick-up device on a disc record is detected by using a mechanical position detecting means and, the rotation of the disc record is controlled by the detected output, a clock component is extracted from a reproduced signal, and the extracted component is used as a comparing signal to further control the rotation of the disc record. However, the employment of such mechanical position detecting means greatly increases the cost of the apparatus.

OBJECTS AND SUMMARY OF THE INVENTION

Accordingly, an object of the present invention is to provide a disc record reproducing apparatus in which a reproduced PCM signal is frequency-divided at a constant frequency dividing ratio, the frequency-divided signal is frequency-compared with a reference frequency signal and the compared output is used to control the rotation of a disc record.

Another object of the invention is to provide a disc record reproducing apparatus can reproduce a disc record at a constant line velocity without using a pulse generator and a position detector for a reproducing head.

A further object of the invention is to provide a disc record reproducing apparatus in which a disc record to be reproduced is rotated at a constant line velocity and in which the position of the disc record can be controlled.

In this invention, a PCM signal in the form of an RLLC is restricted such that its run length is selected in a constant range or a multiple of a clock period by an integer time, for example, from 6 times to 26 times. When the PCM signal in the form of the RLLC is frequency-divided by 1/M (where M is an integer), if M is sufficiently large, the frequency of the frequency-divided signal becomes substantially constant. While, when a disc on which a PCM signal in the form of the RLLC is recorded is reproduced, signals of "1" and "0" can be once provided in correspondence with the existence or absence of a pit no matter what the rotating velocity of the disc record is. Accordingly, it is possible to frequency-divide the reproduced PCM signal by 1/M. In this case, the frequency f of the frequency-divided signal will vary in response to the rotating velocity of the disc record. That is, in the case where a PCM signal is recorded on a disc which is rotated at a constant line velocity, if the line velocity of the disc record during reproducing is the same as that upon recording, the frequency f will fall near or before and after a constant frequency $f_o$. While, if the line velocity of the disc record during reproducing is higher than that upon recording, the frequency f becomes higher than $f_o$, but if the line velocity during producing is lower than that during recording, the frequency f becomes lower than $f_o$.

According to an aspect of the present invention, a disc record reproducing apparatus is provided which comprises:

(a) a disc on which a PCM (pulse code modulation) signal in the form of an RLLC (run length limited code) is recorded;

(b) a motor for rotating said disc;

(c) a detecting head for scanning a recording surface of said disc to detect said PCM signal;

(d) a frequency divider for frequency-dividing a reproduced PCM signal by said detecting head;

(e) a reference oscillator for generating a reference frequency signal;

(f) a frequency comparator coupled to said frequency divider and said reference oscillator for comparing a frequency of the signal generated from said reference oscillator with a frequency of the signal delivered from said frequency divider to produce an output responsive to a compared result; and (g) a motor drive circuit coupled to said frequency comparator for driving said motor by an output from said frequency comparator such that the relative velocity of said detecting head to said disc becomes a constant line velocity irrespective of the relative position of said detecting head to said disc.

The other objects, features and advantages of the present invention will become apparent from the following description taken in conjunction with the accompanying drawings.

BRIEF DESCRIPTION OF THE DRAWINGS

FIG. 1 is a waveform diagram showing a reproduced signal of a recorded PCM signal in the form of an RLLC;

FIGS. 2A and 2B are respectively waveform diagrams showing a reproduced PCM signal and that provided by frequency-dividing the reproduced PCM signal.

DESCRIPTION OF THE PREFERRED EMBODIMENT

Figure 3:
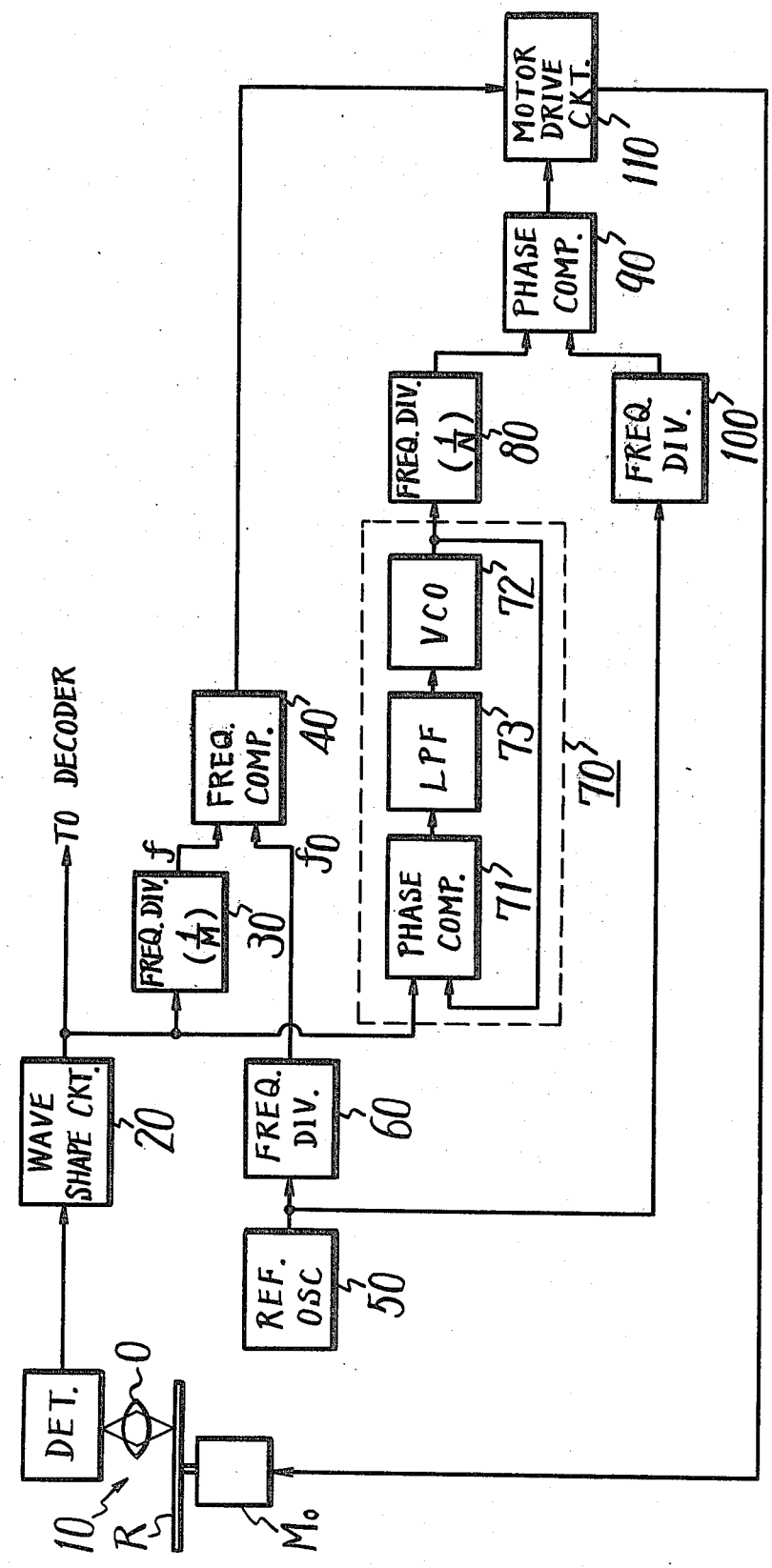
FIG. 3 is a block diagram showing an example of the disc record reproducing apparatus according to the invention.

The present invention will be hereinafter described with reference to the attached drawings.

As shown in FIG. 1, a PCM signal p in the form of an RLLC is so restric ed that its run length $R_L$ is selected as an integer multiple of the clock period and also falls within a constant range form, for example, 6 times to 26 times the clock period. When the PCM signal p in the form of the RLLC shown in FIG. 2A is frequency-divided by 1/M, if the integer M is sufficiently large, the frequency of a frequency-divided PCM signal D becomes substantially constant as shown in FIG. 2B.

In the case that a disc record on which the PCM signal in the form of the RLLC is recorded is reproduced, no matter what the rotating velocity of the disc record is, a signal of "1" and "0" corresponding to whether or not a pit is present can be detected. Accordingly, it is possible for the reproduced PCM signal to be frequency-divided by 1/M. In this case, the frequency f of the frequency-divided PCM signal varies in response to the rotating velocity of the disc record. In the case of a disc record on which a PCM signal is recorded while the line velocity of the rotating disc record is constant, if the line velocity of the disc record during reproducing is selected to be the same as that during recording, the frequency f will fall near or before and after the constant frequency $f_o$. If the line velocity of the disc record during reproducing is higher than that during recording, the frequency f becomes higher than the frequency $f_o$, while if the line velocity of the disc record during reproducing is lower than that during recording, the frequency f becomes lower than the frequency $f_o$.

In the invention, the above fact is taken into consideration to control the rotation of a disc record in a manner such that a reproduced PCM signal is frequency-divided at a constant frequency dividing ratio, the frequency-divided PCM signal is then compared with a reference signal and the rotation of the disc record is controlled by the compared output.

Turning to FIG. 3, an example of the disc record reproducing apparatus according to the invention will be described. In FIG. 3, reference latter R designates a disc such as an optical recording disc on which a PCM signal in the form of an RLLC is recorded and which is rotated by a motor Mo. The PCM signal recorded on the disc record R is reproduced by a detecting head 10, which includes an optical system O, as an electrical PCM signal. The reproduced electrical PCM signal is in turn fed through a wave shaping circuit 20 to a well known decoder (not shown). The reproduced PCM signal passed through the wave shaping circuit 20 is also applied to a frequency divider 30 in which the reproduced PCM signal is frequency-divided by 1/M where M is selected to be as, for example, 256. The frequency-divided PCM signal (with the frequency of f) from the frequency divider 30 is supplied to one of the input terminals of a frequency comparator 40.

A reference oscillator such as a quartz oscillator 50 is provided. The output signal or reference frequency signal from the quartz oscillator 50 is frequency-divided in a frequency divider 60 from which a reference signal with the above constant or reference frequency $f_o$ is derived. This reference frequency signal is applied to the other input terminal of the frequency comparator 40. The output signal from the frequency comparator 40 is applied through a motor drive circuit 110 to the motor Mo, which drives the disc record R as described above, to control the rotation thereof. Thus, the rotation of the disc record R is so controlled that the frequency f of the frequency-divided signal from the frequency divider 30 becomes equal to the reference frequency $f_o$ of the signal from the frequency divider 60.

When the PCM signal in the form of the RLLC is frequency-divided by 1/256, the frequency of the frequency-divided signal falls in a range between about ±10% of a certain frequency. Therefore, according to the apparatus of the invention shown in FIG. 3, regardless of the relative position of the detecting head 10 to the disc record R, the relative velocity of the head 10 to the disc record R or line velocity of the disc record R during reproducing becomes substantially constant.

In practice, in order to control the rotation of the motor Mo and hence disc record R more precisely, a further system is provided. That is, as shown in FIG. 3, the reproduced PCM signal from the wave shaping circuit 20, which has the substantially constant frequency f when it is frequency-divided by 1/M as set forth above, is also fed to a PLL (phase locked loop) circuit 70 for generating a bit clock from which a clock is produced. The PLL circuit 70 is formed of a phase comparator 71, a voltage controlled oscillator 72 and a low pass filter 73. The output clock signal from the PLL circuit 70 is frequency-divided by 1/N (N is an integer) in a frequency divider 80 to obtain a frequency suitable for driving the motor Mo. The frequency-divided clock signal from the frequency divider 80 is applied to one of the input terminals of a phase comparator 90. While, the output signal from the quartz oscillator 50 is also applied to another frequency divider 100 which produces an output signal of a frequency of 1/N of the normal clock signal frequency as a reference frequency signal. This reference frequency signal is supplied to the other input terminal of the phase comparator 90. The compared output signal therefrom is applied through the motor drive circuit 110 to the motor Mo to control its rotation. Accordingly, the rotation of the disc record R is so controlled that the frequency of the clock component of the reproduced PCM signal becomes the reference clock signal frequency.

As described above, according to the present invention, the disc record, on which the PCM signal in the form of the RLLC is recorded with a constant line velocity, can be reproduced with constant line velocity of the disc record with a simple circuit construction.

Further, according to the invention, a disc record on which the PCM signal in the form of the RLLC is recorded with constant angular velocity of the disc can be reproduced with constant angular velocity of the disc record.

It will be apparent that many modifications and variations could be effected by one skilled in the art without departing from the spirits or scope of the novel concepts of the present invention, so that the spirits or scope of the invention should be determined by the appended claims only.

We claim as our invention:

1. A disc record reproducing apparatus comprising, a disc on which a PCM (pulse code modulation) signal in the form of an RLLC (run length limited code) is recorded, a motor for rotating said disc, a detecting head for scanning a recording surface of said disc to detect the PCM signal, a frequency-divider for frequency-dividing a reproduced PCM signal by said detecting head with a dividing factor of m where m is greater than 100, a reference oscillator for generating a reference frequency signal, a frequency comparator coupled to said frequency divider and said reference oscillator for comparing the frequency of the signal generated from said reference oscillator with the frequency of the signal delivered from said frequency divider to produce an output proportional to the compared signals, a motor drive circuit coupled to said frequency comparator for driving said motor by the output from said frequency comparator such that the relative velocity of said detecting head to said disc becomes a constant line velocity responsive of the relative position of said detecting head to said disc, and further comprising a voltage controlled oscillator, a first phase comparator receiving the reproduced PCM signal and a signal generated by said voltage controlled oscillator and producing an output proportional to their phase differences and supplying said output to said voltage controlled oscillator, a second phase comparator receiving an input from said voltage controlled oscillator and an input from said reference oscillator and producing an output proportional to the phase differences between said inputs, and said motor drive circuit receiving an input from said second phase comparator.

* * * * *